April 12, 1966   H. A. LESLIE ETAL   3,245,339
APPARATUS FOR PRODUCING CITRUS JUICES
Original Filed Nov. 20, 1961   4 Sheets-Sheet 2

INVENTORS
*HARRY A. LESLIE*
*FRANKLIN K. HOLBROOK*
BY *RICHARD A. ANDREWS*

*Paul A. Weilein*
ATTORNEY

April 12, 1966        H. A. LESLIE ETAL        3,245,339
APPARATUS FOR PRODUCING CITRUS JUICES
Original Filed Nov. 20, 1961                    4 Sheets-Sheet 3

INVENTORS
HARRY A. LESLIE
FRANKLIN K. HOLBROOK
BY RICHARD A. ANDREWS
Paul A. Weilein
ATTORNEY April 12, 1966  H. A. LESLIE ETAL  3,245,339
APPARATUS FOR PRODUCING CITRUS JUICES
Original Filed Nov. 20, 1961  4 Sheets-Sheet 4
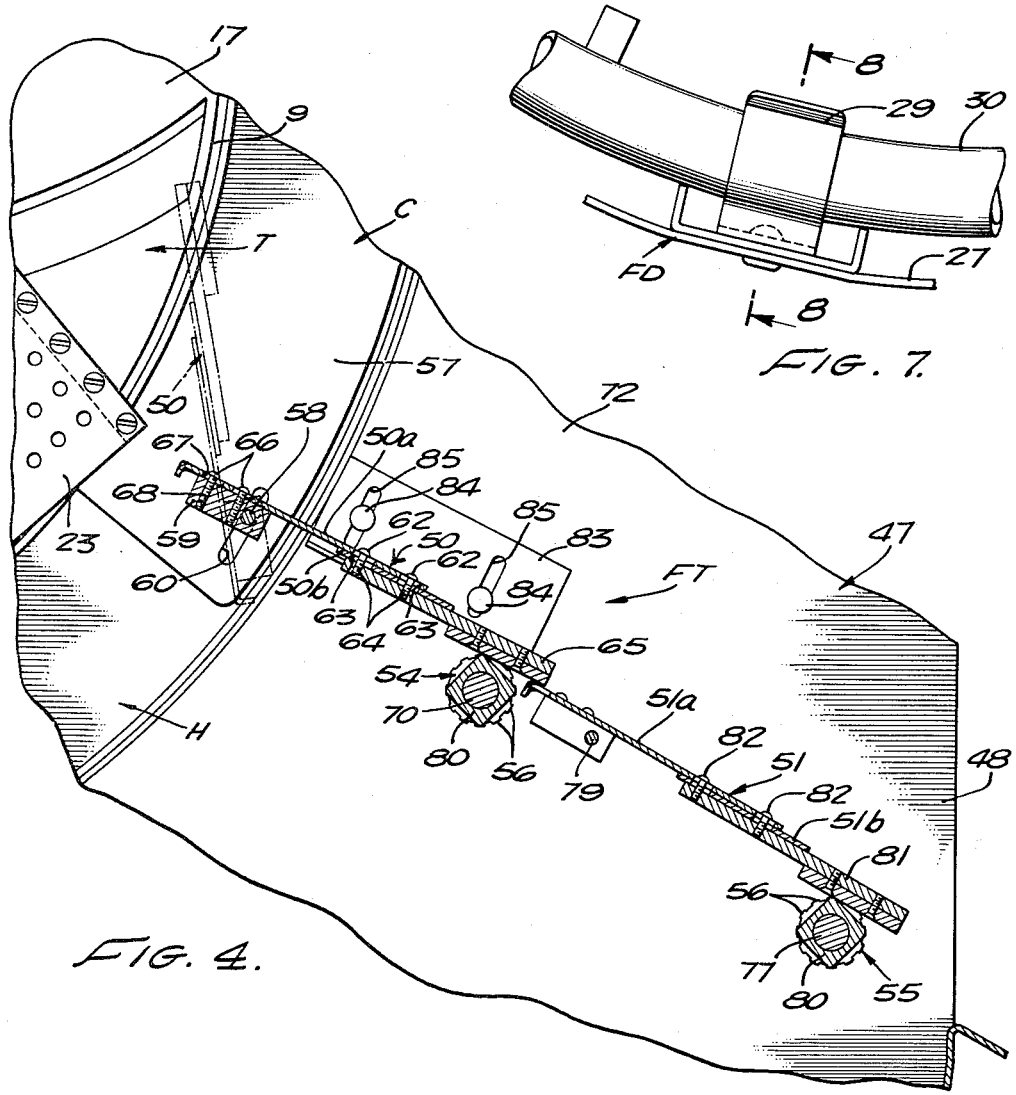
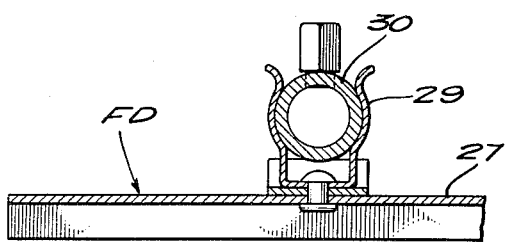
INVENTORS
HARRY A. LESLIE
FRANKLIN K. HOLBROOK
BY RICHARD A. ANDREWS
Paul A. Weilein
ATTORNEY United States Patent Office 3,245,339
Patented Apr. 12, 1966

3,245,339
APPARATUS FOR PRODUCING CITRUS JUICES
Harry A. Leslie, Covina, and Franklin K. Holbrook and Richard A. Andrews, Whittier, Calif., assignors to Brown Citrus Machinery Corp., Whittier, Calif., a corporation of California
Original application Nov. 20, 1961, Ser. No. 153,526, now Patent No. 3,161,123, dated Dec. 15, 1964. Divided and this application Mar. 19, 1964, Ser. No. 353,074
14 Claims. (Cl. 100—105)

This invention relates to apparatus for extracting juice from citrus fruit and is a division of our application Serial No. 153,526, filed November 20, 1961 for Method and Apparatus for Producing Citrus Juices, is now Patent No. 3,161,123, dated December 15, 1964.

It is an object of this invention to provide an improvement in juice extracting apparatus, for example, apparatus forming the subject matter of U.S. Patents No. 2,767,644 and No. 2,767,645, issued October 23, 1956 to F. W. Bireley.

It is another object of this invention to provide juice extracting apparatus for treating the pulp and fruit rinds as these elements are released from the extraction zone so that some of the pulp and the juice clinging to the rind will be released and discharged into the smaller batch of juice that is collected from the zone in which the greater pressure is applied, thereby increasing the amount of juice extracted in accordance with this invention.

It is therefore another object of this invention to provide novel apparatus for use in connection with juice extracting means of the character described which will receive and agitate the pulp and rinds discharged from the extraction zone in such a manner as to recover desired components of these released parts for addition to the smaller batch of juice extracted from that part of the extraction zone in which the greater pressure is applied.

It is another object of this invention to provide in connection with juice extracting apparatus such as described, a novel arrangement of two juice collecting wells and a flow dividing unit in which the latter is interposed between the two wells and the extraction zone. This flow dividing unit is operable to separate the juices flowing from the extraction zone to form a first flow path and a second flow path. With this arangement, the greater amount of the total juice extracted from a given amount of fruit will be confined to the first flow path so as to flow into one well, while the lesser amount of juice flowing from the remainder of the extraction zone will be confined to the second flow path so as to flow into the other well. This collection of two separate batches of juices make it possible to achieve advantages herein noted. Moreover, this arrangement includes the location of the well for containing the lesser amount of juice from the second flow path, so that juice recovered by the pulp and rind treating means aforementioned will flow therefrom into the second well.

Other objects and advantages of the invention will be hereinafter described or will become apparent to those skilled in the art, and the novel features of the invention will be defined in the appended claims.

Referring to the drawings:

FIG. 4 is a fragmentary sectional view on an enlarged scale taken on the line 4—4 of FIG. 3;

FIG. 7 is an enlarged fragmentary side elevational view of the adjustably mounted juice flow dividing means shown at the lower left side of FIG. 1; and FIG. 8 is a fragmentary sectional view taken on the line 8—8 of FIG. 7.

Figure 1:
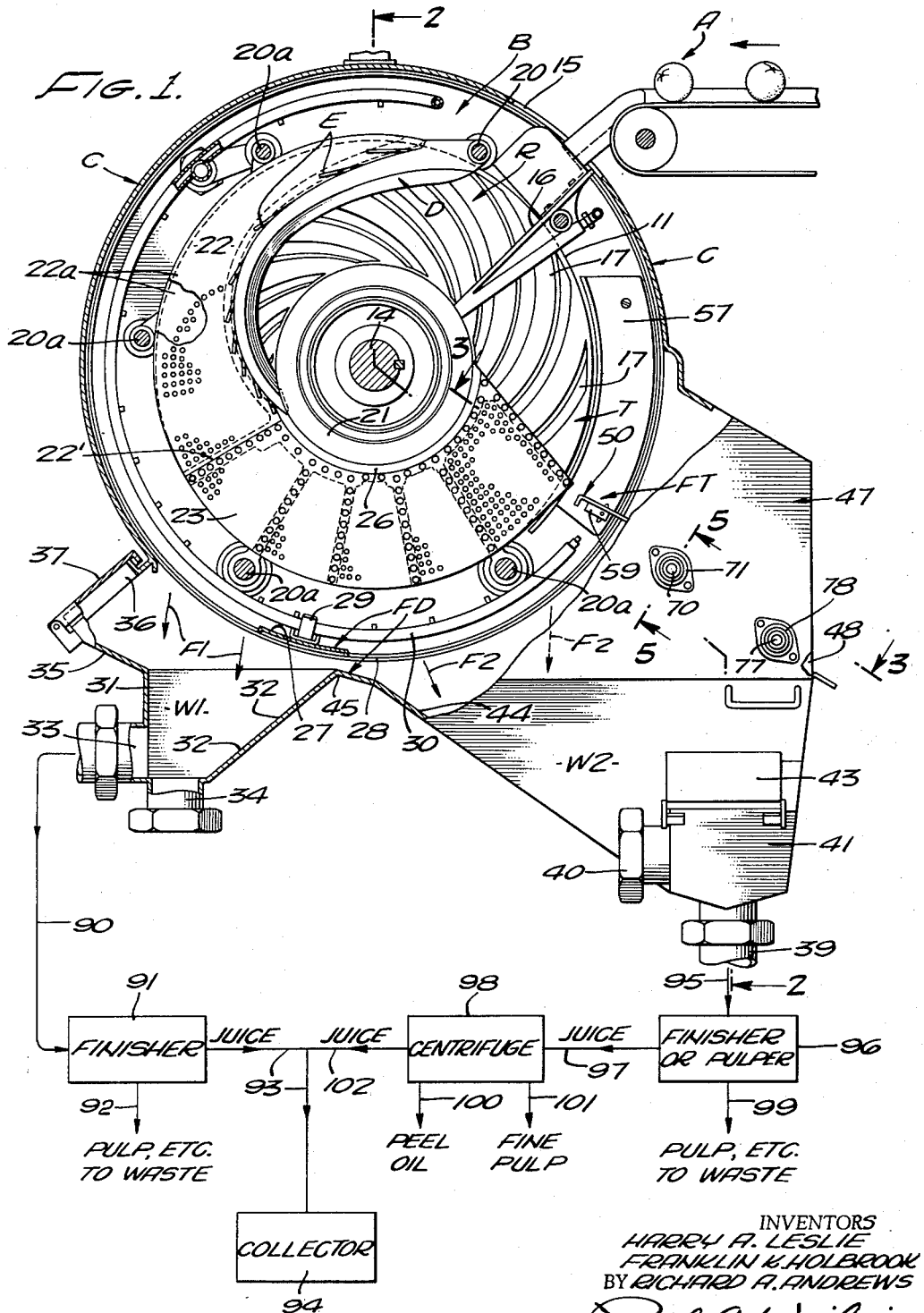
FIG. 1 is a sectional view of juice extracting apparatus in which the present invention is embodied and showing diagrammatically a method of treatment of the extracted juices and other fractions of the citrus fruit in accordance with this invention.

The apparatus of this invention generally includes feeding means A for feeding whole citrus fruit of various sizes to juice expressing means B in a housing C, the housing being removably mounted on a vertically disposed bulkhead H. Knives D are arranged in the housing C to bisect the fruit, and these knives have associated therewith and extending therealong slitting knives E arranged to slit across the cut faces of the fruit halves bisected by the knives D, as well as across the rind edges of such halves. This slitting of the fruit halves across the faces and edges of the rind makes it possible to apply pressure for obtaining optimum amounts of juice by substantially flattening the halves with a reduction in the amount of pulp and rind oil released with the juice.

The juice expressing means B includes a series of conical disks 8, 9, 10, 11, 12, and 13 keyed on a power driven shaft 14 journalled in the bulkhead H. These disks are arranged so that three pathways designated P, R, and S are formed between these disks and in which the fruit is advanced during rotation of the disks.

The whole fruit discharged by the feeding means A passes through an opening 15 in the housing C onto feed chutes 16 which discharge the fruit into the pathways P, R, and S.

The opposed surfaces of the rotative disks 8 through 13, converge radially toward the axes of the disks, that is, converge in a direction transverse to the direction in which the fruit is advanced in the pathways P, R, and S. Thus, the whole fruit dropping into these pathways from the chutes 16 will become wedged between the disks 8, 9, 10, 11, 12, and 13 at different levels according to the size of the fruit. Gripped in this manner between the rotative disks, the whole fruit will be advanced along the pathways for further treatment. The opposed surfaces of the rotative disks 8 through 13 may be covered, as here shown, with annular elastic rubber members 17 which may be grooved or otherwise provided with irregular surfaces for yieldably gripping the fruit to hold each piece in place, yet prevent such abrasion of the fruit as would release objectionable amounts of oil.

The bisecting knives D are secured at their upper ends to supports 20 extending into the housing C from the bulkhead H and at their lower ends are joined to the spacer ring 21 surrounding the shaft 14.

As the whole fruit is advanced in the pathways P, R, and S by the related disks 8 through 13, the knives D will bisect the fruit, and as the resultant fruit halves move past the knives D, the slitting knives E will cut slits across the cut faces and rind edges of the fruit.

Each of the pathways P, R, and S has associated therewith an arcuate, perforated partition plate 22 and a pair of perforated arcuate pressure plates 23 and 24 opposed to one another and, like the plate 22, spaced from the opposed surfaces of the associated pair of rotary disks 8–13. These plates are mounted on support members 20a extending from the bulkhead H and, together with the related rotary disks, define a pair of arcuate pressure paths P1 and P2. Thus, a pair of the pressure paths is provided between each related pair of the disks. Each plate 22 is composed of opposed plate sections 22a joined at their inner arcuate edges and extending divergently therefrom so that, in effect, the plate increases in thickness in the direction of advance of the fruit. The lower end of the sections of the plate 22 are joined as at 22' to the pair of perforated pressure plates 23 and 24, which latter, along their inner arcuate edges, are joined to an arcuate hub portion 26 embracing the spacer ring 21 on the shaft 14. The two perforated plates 23 and 24 extend somewhat spirally along the pressure paths P1 and P2 to the discharge zone T, the plates diverging radially from the hub portion 26 with a progressive increase in the extent of divergence in the direction of advance of the fruit along the paths P1 and P2. With this arrangement each pressure path P1 and P2 gradually narrows in the direction of advance of the fruit as well as transversely of the direction of advance, with the result that the fruit halves, regardless of size and the levels at which they advance in the paths P1 and P2, will be substantially flattened when they reach the discharge zone T.

As the fruit halves are advanced past the knives D and E, they will enter the pressure paths P1 and P2 and be compressed to thereby start the juice extracting operation. The cut faces of the halves slide along opposite faces of plates 22 while rind sides of the halves are gripped by rubber covered surfaces of the rotary disks 8–13. The pressure applied to the fruit halves progressively increases as the halves advance from the lower ends of the plates 22 onto the outer faces of the upper portions of the opposed pressure plates 23 and 24.

During the advance of the fruit halves along the pressure paths P1 and P2, each of which, as here shown, has an arcuate extent of approximately 180°, the juice will gravitate from the entire extraction zone defined by the pressure paths.

In accordance with the present invention, the gravitational flow of juices from along the entire extraction zone is controlled by flow dividing means FD which confines the flow to two flow paths as indicated by the arrows F1 and F2 and hereinafter referred to as flow paths F1 and F2, respectively. These flow paths cause the juices to be collected in wells W1 and W2 or similar containers located at predetermined positions with respect to predetermined portions of the extraction zone of the juice extracting apparatus. Accordingly, the flow dividing means FD is mounted in the housing C beneath the arcuate perforated pressure plates 23 and 24 in a position such that the flow path F1 will encompass all of the gravitational flow area between the upper ends of pressure paths P1 and P2 and the flow divider means FD, this area comprising, for example, about two-thirds of the extraction zone. The other flow path F2 embraces the remainder, for example, about one-third of the extraction zone.

The flow divider means FD may be of any suitable form provided it will divide the flow from the extraction zone as herein noted, and as here shown, it includes a rectangular baffle plate 27 which extends across the lower central portion of the housing C, which latter has an opening 28 along the lower side thereof to permit flow of juices into the wells W1 and W2. The position and inclination of the plate 27 are such that it will direct juice dropping thereon into the well W2. The amount of juice thus directed by the plate 27 may be varied by adjusting the plate with respect to the wells W1 and W2. The flow divider means also includes the joint of walls of the wells W1 and W2, which joint will be hereinafter described.

Figure 2:
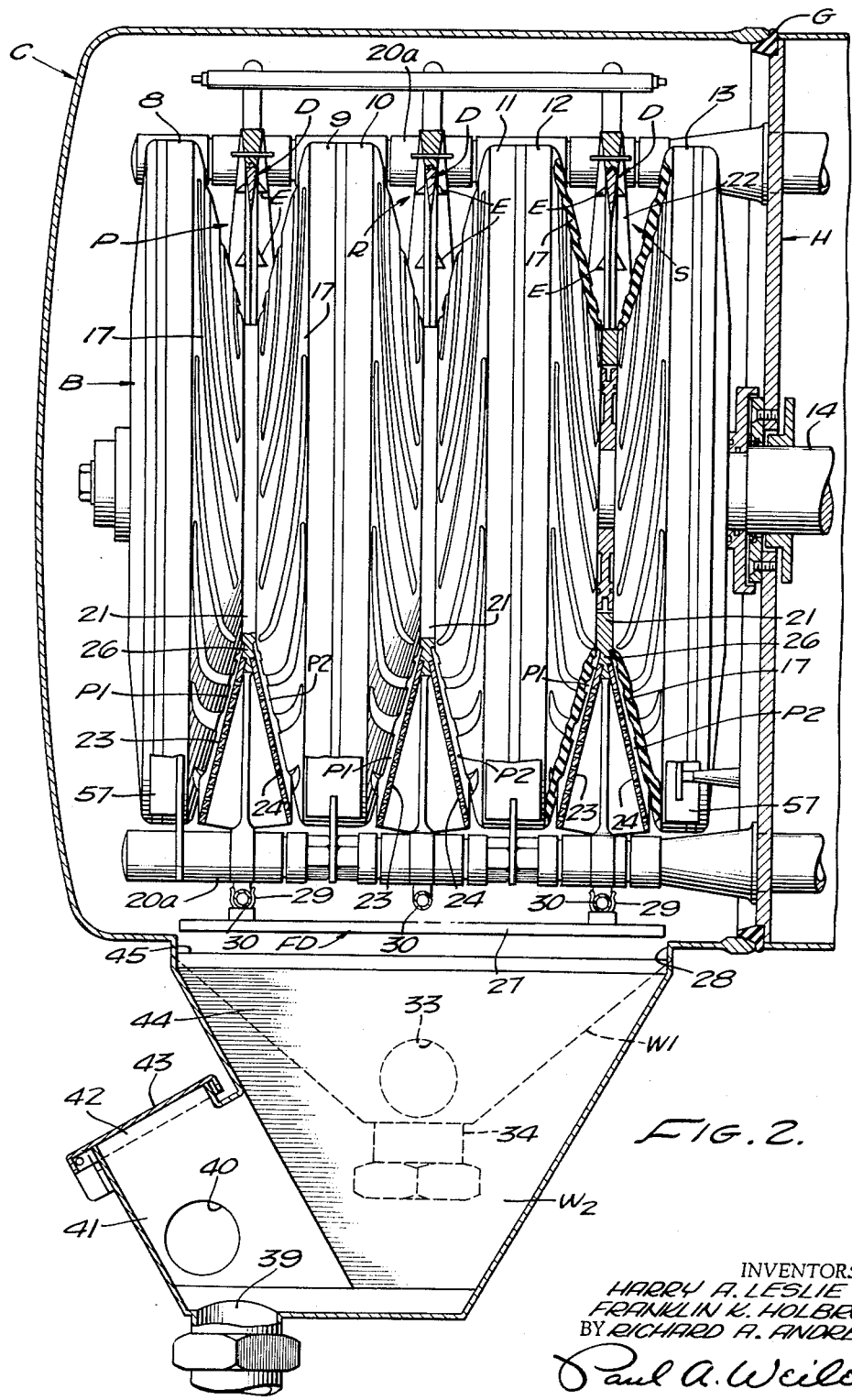
FIG. 2 is a sectional view on an enlarged scale taken on the line 2—2 of FIG. 1.

Spring clips 29 secured to the baffle plate 27 slidably embrace arcuate spray pipes 30 in the housing to adjustably support the flow dividing plates 27 in the desired position to vary the flow of juices into the wells W1 and W2. The spray pipes 30 are supported by the bulkhead H and are used to clean the apparatus, being adapted to be operated to spray water or other cleansing fluids onto the disks 8–13 and related juice extracting parts of the apparatus. In this connection, it should be noted that the housing C is removably mounted on the bulkhead H, there being a rubber sealing gasket G between the housing and bulkhead. It will be apparent with reference to FIG. 2, that the housing may be removed from the bulkhead in a direction axially of the shaft 14 to facilitate access to the disks and associated elements for adjustment and inspection thereof, as well as for cleaning purposes.

The plate 27 of the flow divider means FD may be positioned, as here shown, so that the amount of juice collected in the well W1 constitutes more than half of the total juice extracted from a given amount of fruit, and as this juice has been released from the fruit under less pressure than employed to produce the remainder of the juice, it contains considerably less rind oil, pulp and other fractions than in the juice released at greater pressure. Accordingly, the juice in well W1 produced readily with a minimum of handling and treatment, is subject to use as a juice product of acceptable quality or for use in conjunction with any product in which a citrus juice having a low oil and pulp content is tolerated, it only being necessary in some instances in order to render this large volume of juice suitable for some uses, to subject it to a simple finishing operation in which the pulp therein is treated to release therefrom all juice and then for the most part removed from the juice.

The juice collecting well W1 has side walls 31 which are joined in any suitable manner to the housing C so as to enclose that portion of the opening 28 in the lower side of the housing, that is, over the well W1. A wall 32 of the well W1 is inclined so that juice will flow thereon to a suitable discharge opening 33 adjacent the bottom of the well where a suitably plugged drain opening 34 is provided to one side of the discharge opening. An upward extension 35 of the well W1 is provided with a clean-out opening 36 having a removable cover 37.

The other juice collecting well W2 is joined to the housing C in any suitable manner to enclose the portion of the opening 28 in the housing disposed over the wall W2. At its lower end the well W2 is provided with a suitable discharge opening 39 and a plugged clean-out or drain opening 40. An upward extension 40 of the well is provided with a clean-out opening 42 having a suitable cover 43.

As shown in FIG. 1, an inclined wall 4 of the well W2 is joined at its upper end to the upper end of inclined wall 32 of well W1 at a point beneath and adjacent to the flow divider unit FD. Shifting of the plate 27 of the flow divider unit FD relative to the juncture portion 45 of the inclined walls 32 and 44 will vary the flow of juice into the respective wells for the purpose hereinbefore mentioned. Moreover, the juncture portion 45 is inclined so that juice dropping thereon will flow into the well W2.

The well W2, if desired, may be larger than well W1 since it will contain a greater amount of pulp in view of the fact that the fruit passing through that part of the extraction zone over the well W2 will be subjected to greatest pressure, also in view of the fact that additional pulp and juice will be discharged in the well W2 from pulp and juice recovery means generally designated FT for further treating the pulp and rind discharged into the zone T. The side walls of well W2 are inclined so that pulp and juice readily will flow thereon to the discharge opening 39.

As shown in FIG. 1, a housing 47 formed as a continuation of the housing C and walls of the well W2 encloses the juice and pulp recovery means FT, which latter operates to treat the rinds and fruit particles discharged at the discharge zone T in such a manner that juice and pulp will be recovered from the rind and drop into the well W2, while the spent rinds and other fruit particles will be discharged through an opening 48 in the housing 47. This recovery is effected by causing the rinds and fruit particles leaving the pressure zones P1 and P2 to be discharged onto vibratory plates 50 and 51 which, as shown in FIG. 4, are inclined so as to direct the rinds and fruit parts toward the discharge opening 48 in the housing 47. These vibratory plates are spaced to define gaps or openings 52 and 53 through which recovered juice and pulp will flow into the well W2.

Figure 3:
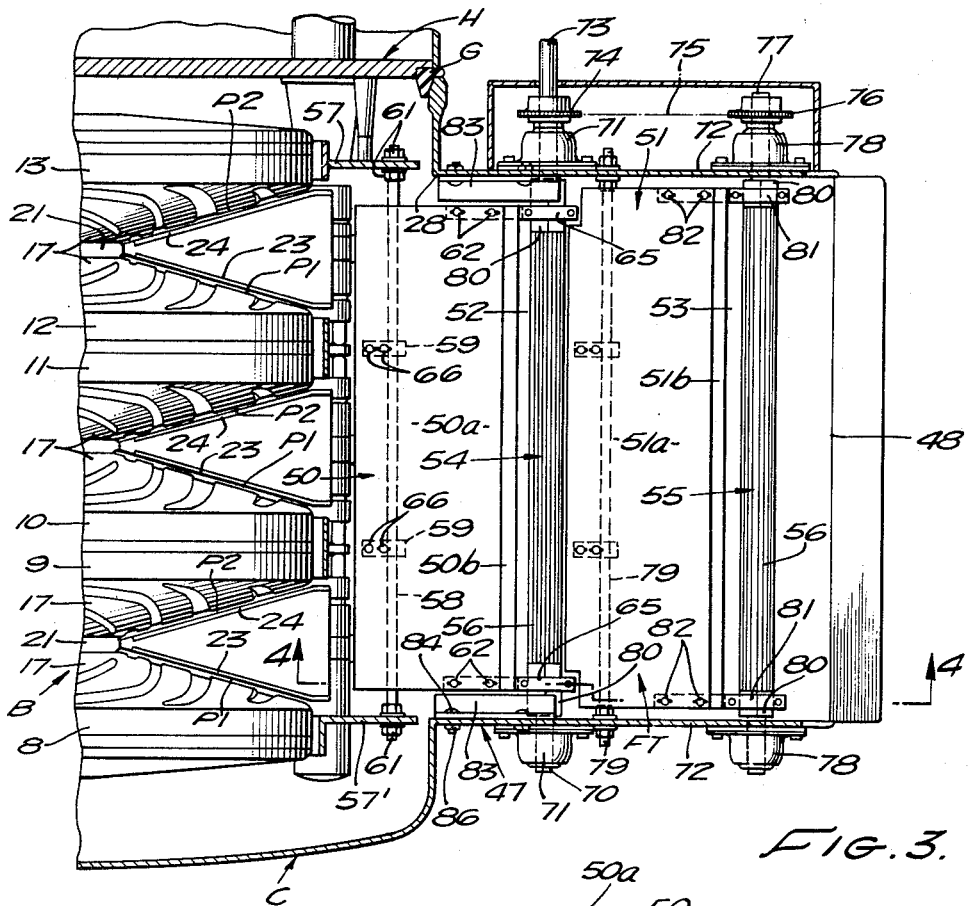
FIG. 3 is a fragmentary sectional view on an enlarged scale taken on the line 3—3 of FIG. 1.
Figure 6:
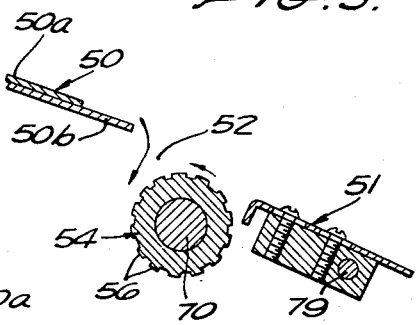
FIG. 6 is a fragmentary sectional view taken on the line 6—6 of FIG. 5.

As shown in FIGS. 3 and 6, rollers 54 and 55 are positioned beneath the gaps 52 and 53 to prevent the rinds and larger fruit particles from dropping through the gaps or openings. These rollers are rotated in a counterclockwise direction and have roughened surfaces, for example, in the form of longitudinal ribs or corrugations 56 so that fruit pulp and small fruit particles coming in contact therewith will be carried around and discharged into the spaces between the rollers and the adjacent edges of the vibratory plates, whereby the recovered pulp or juice will drop into the well W2, while the rinds slide over the tops of the rollers.

The vibratory plate 50 is rectangular and pivotally mounted as shown in FIG. 3 on splash plates 57 and 57' supported by the bulkhead H within the housing C so that the rear longitudinal edge of the plate 50 may be disposed sufficiently close to the ends of the pressure paths P1 and P2 to cause the rind and fruit particles to be discharged from such paths onto the plate. Accordingly, a pivot rod 58 carried by lugs 59 beneath the plate 50 has its ends extended through slots 60 in the splash plates 57 and 57' to pivotally mount the plates. The splash plates, as will be apparent with reference to FIG. 3, will guide the rinds and fruit parts from the two outermost pressure paths onto the plate 50. The slots 60 permit the rear portions of the plate 50 to be raised or lowered best to position this rear portion thereof with respect to the discharge ends of the pressure paths P1 and P2. Nuts 61 threaded on the pivot rod 58 so as to clamp against the splash plates 57 and 57' provide for maintaining the desired adjustment of the vibratory plate 50.

The plate 50 may, as here shown, be made of two rectangular sections 50a and 50b that are relatively adjustable to vary the gap between the ends of the pressure paths P1 and P2 and the plate 50, as well as the gap between the plate 50 and the roller 54. Accordingly, the plate sections 50a and 50b are adjustably joined in overlapping relation by means of suitably headed fastenings 62 inserted through registered slots 63 in the plate sections and threaded into opening 64 in roller engaging arms 65 projecting from both plate sections. In order that the upper plate section 50a may be adjusted relative to the discharge ends of the pressure paths P1 and P2, the upper section is adjustably secured to the lugs 59 by means of fastenings 66 extended through slots 67 in the upper plate section and threaded into opening 68 in the lugs 59.

The roller 54 beneath the gap 52 between vibratory plates 50 and 51 is mounted on a driven shaft 70 supported in bearings 71 on the walls 72 of the housing 47, one end of the shaft being extended as at 73 for connection with suitable driving means, not shown. This extended end 73 of the shaft 70 has a sprocket 74 thereon for driving a chain 75 which in turn drives a sprocket 76 on a shaft 77 for the roller 54 associated with the vibratory plate 51. The shaft 77 is mounted in bearings 78 on the walls 72. The plate 51 is pivoted at a fixed location on the walls 72 by means of a rod 79 similar to the rod employed in connection with the plate 50.

Figure 5:
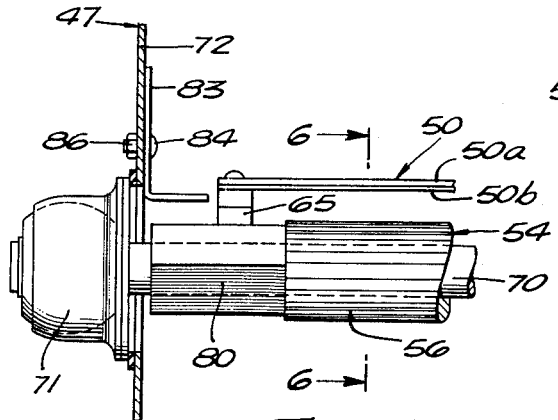
FIG. 5 is an enlarged fragmentary sectional view taken on the line 5—5 of FIG. 1.

As a means for vibrating the plates 50 and 51, the shafts 70 and 77 are provided at their ends with like cam portions 80 of non-circular cross-section, and as shown in FIGS. 3 and 5, the arms 65 on the vibratory plate 50 and similar arms 81 on the plate 51 rest upon the cam portions 80. As the shafts 70 and 77 revolve, the plates 50 and 51 will be forcibly vibrated about their pivotal axes to separate and jar loose juices and some of the pulp clinging to the rind, the juices and pulp thus recovered being discharged into the well W2 through the gaps 52 and 53.

The vibratory plate 51 may be, as here shown, made in two sections 51a and 51b adjustably connected by the fastening means 82 corresponding to the means for adjustably joining the sections of the plate 50.

In order to close spaces between the walls 72 of the housing 47 and the vibratory plates 50 and 51, baffle members such as the members 83 may be employed. As here shown, two of the members 83 are vertically adjustably mounted on the walls 72 by means of fastenings 84 extending through slots 85 in members 83 and secured by nuts 86 to the walls 72, whereby the members 83 may be adjusted to be disposed in position to prevent the rinds from dropping past the ends of the plate 50, in accordance with the adjusted positions of the plate 50.

With reference to FIG. 3, it will be apparent that the housings C and 47 may be removed as a unit from the bulkhead H supporting these housings. Accordingly, the vibratory plate 50 of the pulp and juice recovery means FT is mounted so that it can be swung on the pivot rod 58, to the out-of-the-way position shown in dot-dash lines in FIG. 4, whereby the housing C may be moved axially of the shaft 14 away from the bulkhead H. All other parts of the means FT are carried by the housing 47.

The apparatus of this invention makes it possible to carry out the method illustrated diagrammatically in FIG. 1 and which provides for continuously treating the citrus juices and other fractions flowing from the two juice collecting wells W1 and W2. As the juice with its comparatively low oil and pulp content flows from the well W1, it is conducted by conduit means 90 to a finished unit 91 where the pulp content is treated to express juice therefrom, and thereafter most of the pulp is discharged through a waste line 92. From this finisher unit 91, a conduit 93 conducts the juice to a collector unit 94. The juice in the unit 94 is of acceptable quality for juice products, although it is obvious that juice taken directly from the well W1 could be used in some instances in view of its low oil and pulp content. However, after being treated in the finished unit 91, the juice is of good quality and may be used as desired or further treated and augmented in quantity by the addition thereto of juice and fractions derived by the well W2.

Juice from the well W2 is caused to flow through a conduit 95 to a finisher unit 96 which treats the juice and pulp in the same manner as the finisher unit 91, in that the treated juice free of most of the undesirable amount of pulp is conducted through a conduit 97 to a centrifuge unit 98, while the waste pulp is discharged through the waste line 99. The centrifuge unit 98 is provided with a discharge line 100 for taking off the rind oil as a product for any uses desired. The centrifuge unit 98 also has a waste line 101 through which fine pulp is discharged. The treated juice leaving the centrifuge unit 98 through a conduit 102 is substantially of the same quality as the juice leaving the finisher unit 91 and may, as here shown, be conducted to the conduit 93 so as to flow into the collector unit 94 and thereby become mixed with the juice derived from well W1 to provide a juice of good quality.

Centrifugal separation of rind oil from citrus juice inherently results in the loss of fresh fruit flavor, as is well known in the art. Therefore, by collecting the major portion of the juice expressed under light pressure in the well W1 and finishing this juice to remove pulp without necessitating centrifugal separation of rind oil, the juice thus obtained retains its natural flavor. Such natural flavor is not significantly affected by the subsequent addition to this major portion of the juice obtained, the minor portion of the juice collected in well W2 which has been centrifuged to remove pulp and rind oil. The resultant total volume of collected juice, therefore, has the desired characteristics of fresh flavor and low rind oil and pulp content, and due to the extraction of larger quantities of juice, as described above, a relatively low volumetric cost. Another advantage is that the centrifuge unit provides for recovery of valuable rind oil in nearly the same amount as would be the case if the total juice were centrifuged.

While specific structural details have been shown and described, it should be understood that changes and alterations may be resorted to without departing from the spirit of the invention as defined in the appended claims.

We claim:

1. In apparatus for extracting juice from citrus fruit wherein means are provided to form an extraction zone of given extent and for passing cut parts of citrus fruit through said zone while such parts are compressed with progressively increasing pressure for extracting juice therefrom and causing the juice to flow from said zone, and wherein fruit rinds are discharged from one end of said zone; the improvement which includes spray means in said extraction zone for directing a spray on said means forming said zone; a pair of juice collecting members disposed in the path of juice flowing from different portions of said zone; flow dividing means in said path and including a plate spanning said path operable to direct an amount of the juice from each of said different portions of said zone into one of said collecting members, and means adjustably supporting said plate on said spray means; juice and pulp recovery means operable to receive the rinds discharged at said end of said zone and to separate juice and pulp therefrom; and means for conducting said separated juice and pulp into said one juice collecting member.

2. In apparatus for extracting juice from citrus fruit wherein means are provided to form an extraction zone of given extent and for passing cut parts of citrus fruit through said zone while such parts are compressed with progressively increasing pressure for extracting juice therefrom and causing the juice to flow from said zone, and wherein fruit rinds are discharged at one end of said zone; the improvement which includes juice collecting means disposed to receive juice flowing from said extraction zone; said juice collecting means including a well having the uppermost portion thereof open; and juice and pulp recovery means disposed over said uppermost portion of said well at said end of said zone operable for separating juice and pulp from rinds discharged from said zone and for discharging such separated juice and pulp downwardly through said uppermost open portion of said well of said juice collecting means; said juice and pulp recovery means including movable plates spaced from one another along the path of fruit rinds discharged at said end of said zone for engaging said rinds to remove juice and pulp therefrom upon such movement; and means for moving said plates.

3. In apparatus for extracting juice from citrus fruit wherein means are provided to form an extraction zone of given extent and for passing cut parts of citrus fruit through said zone while such parts are compressed with progressively increasing pressure for extracting juice therefrom and causing the juice to flow from said zone, and wherein fruit rinds are discharged at one end of said zone; the improvement which includes juice collecting means positioned beneath said zone to receive juice flowing from said zone; juice and pulp recovery means operable over said collecting means to separate from the rinds discharged at said zone juice and some of the pulp clinging to said rinds; said collecting means including a well open at the uppermost portion thereof to receive juice and pulp; means for discharging the spent rinds from said recovery means; and means disposed directly over said open uppermost portion of said well, associated with said juice and pulp recovery means and including spaced plates and a member revolvable between said plates in a direction counter to the direction of rind movement for causing said juice and pulp separated from said rinds to be discharged downwardly through said open uppermost portion of said well of said juice collecting means.

4. In apparatus for extracting juice from citrus fruit wherein means are provided to form an extraction zone of given extent and for passing cut parts of citrus fruit therethrough with such parts compressed by progressively increasing pressure for extracting juice therefrom and causing the juice to gravitate from said zone throughout the extent thereof and the rinds to be discharged at one end of said zone; the improvement which includes spray means in said extraction zone for directing a spray on said means forming said zone; a pair of separate juice collecting members disposed beneath separate portions of said zone to receive juice gravitating from said separate portions of said zone; flow divider means including a plate spanning said zone for causing the juice derived from the greater portion of said zone to flow into one of said juice collecting members and the juice derived from the remainder of said zone to flow into the other of said collecting members; clip means adjustably supporting said plate on said spray means; said other juice collecting member having its uppermost portion open; and members cooperable at said end of said zone and over said open uppermost portion of said other juice collecting means for separating from rinds discharged from said zone juice and pulp clinging thereto and causing said separated juice and pulp to flow downwardly through said open uppermost portion and into said other collecting member.

5. In apparatus for extracting juice from citrus fruit wherein means are provided to form an extraction zone of given extent and for passing cut parts of citrus fruit through said zone while such parts are compressed with progressively increasing pressure for extracting juice therefrom and causing the juice to flow from said zone, and wherein the rinds are discharged from said zone; the improvement which includes juice and pulp recovery means including vibratory means onto which rinds are discharged from said zone; means for vibrating said vibratory means to cause juice and pulp to be separated from said rinds; juice collecting means disposed for receiving juices flowing from said zone; and a member cooperable with said vibratory means engageable with rinds for causing the juice and pulp separated therefrom to flow downwardly between said member and said vibratory means into said juice collecting means and for preventing said rinds from entering said juice collecting means.

6. In a fruit juice extractor: a pair of members having oppositely inclined surfaces forming therebetween a space which progressively converges and between which fruit parts are squeezed upon passage through said space; means for causing fruit parts to pass through said space; said members discharging spent fruit from said space; vibratory elements onto which said spent fruit is discharged from said space; said vibratory elements being spaced from one another for discharging juice therefrom and therebetween and means for vibrating said vibratory elements to separate juice and pulp from said spent fruit.

7. In a fruit juice extractor: a pair of members having oppositely inclined surfaces forming therebetween a space which progressively converges and between which fruit parts are squeezed upon passage through said space; means for causing fruit parts to pass through said space; said members discharging spent fruit from said space; a vibratory plate disposed to receive said spent fruit and discharge said spent fruit therefrom; a rotary member adjacent said plate and disposed to contact said spent fruit; means for vibrating said plate and said rotary member to separate juice and pulp from said spent fruit thereon operable in response to rotation of said rotary member; and means for collecting the juice and pulp separated in response to vibration of said vibratory plate.

8. In a fruit juice extractor: a pair of members having oppositely inclined surfaces forming therebetween a space which progressively converges and between which fruit parts are squeezed upon passage through said space; means for causing fruit parts to pass through said space; said members discharging spent fruit from said path; a vibratory plate disposed to receive said spent fruit and discharge said spent fruit therefrom; means for vibrating said plate to separate juice and pulp from the spent fruit thereon; means for collecting the juice and pulp separated in response to vibration of said vibratory plate;

said plate being inclined to discharge juice and pulp from the lower portion thereof; a roller; means mounting said roller in spaced relation to said lower margin to permit juice and pulp to gravitate between said lower margin and said roller while the latter prevents the spent fruit from passing through said space; and means for rotating said roller in a direction opposite to direction of discharge of spent fruit from said plate.

9. In a fruit juice extractor: means operable to extract juice from fruit fed to said means and to discharge the spent fruit therefrom; a first vibratory member disposed to receive said spent fruit and discharge it therefrom; a second vibratory member disposed to receive the spent fruit from said first vibratory member and to discharge said spent fruit; and means for vibrating said vibratory members to separate juice and pulp from the spent fruit thereon; said vibratory members being inclined and spaced one from the other to permit juice and pulp to gravitate from said first vibratory member through the space between said vibratory members and juice and pulp on said second vibratory members to gravitate therefrom.

10. In a fruit juice extractor: means for extracting juice from fruit fed thereto and for discharging spent fruit therefrom; a first vibratory member disposed to receive said spent fruit and to discharge it therefrom; a second vibratory member disposed to receive the spent fruit from said first vibratory member and to discharge said spent fruit therefrom; means for vibrating said vibratory members to separate juice and pulp from the spent fruit thereon; said vibratory members being inclined and spaced to permit juice and pulp to gravitate from said first vibratory member through the space between said vibrating members and juice and pulp on said second vibratory members to gravitate therefrom; a first roller disposed in the space between said vibratory members for contacting the spent fruit and preventing gravitation thereof through said space; and a second roller disposed in spaced relation to the second vibratory plate for contacting spent fruit discharged therefrom and preventing gravitation thereof into the path of juice and pulp gravitating therefrom.

11. In a fruit juice extractor: a pair of members; means mounting said members for rotation about a common axis; means cooperable with said members operable to extract juice from fruit fed between said members and to discharge the spent fruit therefrom; a first vibratory member disposed to receive said spent fruit and to discharge it therefrom; a second vibratory member disposed to receive the spent fruit from said first vibratory member and to discharge said spent fruit therefrom; means for vibrating said vibratory members to separate jquice and pulp from the spent fruit thereon; said vibratory members being incluined and spaced to permit juice and pulp to gravitate from said first vibratory member through the space between said vibrating members and juice and pulp on said second vibratory members to gravitate therefrom; a first roller disposed in the space between said vibratory member for contacting the spent fruit and preventing gravitation thereof through said space; a second roller disposed in spaced relation to the second vibratory plate for contacting spent fruit discharged therefrom and preventing gravitation thereof into the path of juice and pulp gravitating therefrom; and means for rotating said rollers.

12. In a fruit juice extractor: means for extracting juice from fruit; said means including means providing a pressure path in which the fruit is squeezed and advanced and from which the spent fruit is discharged; a first vibratory plate; means mounting said plate adjacent said pressure path in position to receive the spent fruit and thereafter discharge it therefrom; a second vibratory plate; means mounting said second plate adjacent and in spaced relation to said first plate to receive spent fruit therefrom and thereafter discharge the spent fruit; each of said plates being formed of sections; means adjustably securing said sections together operable to permit relative extension and retraction of said sections to vary the spacing of said plates one from the other and the spacing of the first plate relative to said pressure path; and means for vibrating said plates to separate juice and pulp from the spent fruit thereon.

13. In a fruit juice extractor: means for extracting juice from fruit; said means including means providing a pressure path in which the fruit is squeezed and advanced and from which the spent fruit is discharged; a first vibratory plate; means mounting said plate adjacent said pressure path in position to receive the spent fruit and thereafter discharge said fruit therefrom; a second vibratory plate; means mounting said second plate adjacent and in spaced relation to said first plate to receive spent fruit therefrom and thereafter discharge the spent fruit; each of said plates being formed of sections; means adjustably securing said sections together operable to permit relative extension and retraction of said sections to vary the spacing of said plates one from the other and the spacing of the first plate relative to said pressure path; means for vibrating said plates to separate juice and pulp from the spent fruit thereon; said vibrating means including rollers rotatably disposed adjacent said plates; cam means on said rollers; and arms projecting from said plates and engaging said cam means.

14. In a fruit juice extractor: means for extracting juice from fruit; said means including means providing a pressure path in which the fruit is squeezed and advanced and from which the spent fruit is discharged; a first vibratory plate; means mounting said plate adjacent said pressure path in position to receive the spent fruit and thereafter discharge said fruit therefrom; a second vibratory plate; means mounting said second plate adjacent and in spaced relation to said first plate to receive spent fruit therefrom and thereafter discharge the spent fruit; each of said plates being formed of sections; means adjustably securing said sections together operable to permit relative extension and retraction of said sections to vary the spacing of said plates one from the other and the spacing of the first plate relative to said pressure path; means for vibrating said plates to separate juice and pulp from the spent fruit thereon; said vibrating means including rollers rotatably disposed adjacent said plates; cam means on said rollers; arms projecting from said plates and engaging said cam means; said rollers operating to engage the spent fruit discharged from said plates; and means for rotating said rollers.

References Cited by the Examiner

UNITED STATES PATENTS

| 2,708,627 | 5/1955 | Toulmin | 99—2 |
| 2,767,644 | 10/1956 | Bireley | 100—97 |
| 2,767,645 | 10/1956 | Bireley | 100—98 |

WALTER A. SCHEEL, *Primary Examiner.*

LOUIS O. MAASSEL, *Examiner.*